(12) United States Patent
Cheng et al.

(10) Patent No.: US 12,321,452 B2
(45) Date of Patent: Jun. 3, 2025

(54) MONITORING AND VALIDATING FILE ASSOCIATIONS

(71) Applicant: PC Matic Inc, Sioux City, IA (US)

(72) Inventors: Robert J. Cheng, Myrtle Beach, SC (US); Matthew Quincy Riley, Owosso, MI (US)

(73) Assignee: PC MATIC, INC., Sioux City, IA (US)

( * ) Notice: Subject to any disclaimer, the term of this patent is extended or adjusted under 35 U.S.C. 154(b) by 306 days.

(21) Appl. No.: 17/887,605

(22) Filed: Aug. 15, 2022

(65) Prior Publication Data
US 2024/0054216 A1 Feb. 15, 2024

(51) Int. Cl.
*G06F 21/56* (2013.01)
(52) U.S. Cl.
CPC .......... *G06F 21/565* (2013.01); *G06F 21/568* (2013.01); *G06F 2221/033* (2013.01)
(58) Field of Classification Search
USPC .......................................................... 726/23
See application file for complete search history.

(56) References Cited

U.S. PATENT DOCUMENTS

| | | | |
|---|---|---|---|
| 8,006,303 B1 * | 8/2011 | Dennerline | H04L 63/1408 726/23 |
| 10,530,802 B2 * | 1/2020 | Thomas | G06F 21/565 |
| 10,693,901 B1 * | 6/2020 | Chan | H04L 67/02 |
| 11,354,414 B2 * | 6/2022 | Spernow | G06F 21/566 |
| 11,797,493 B1 * | 10/2023 | Crimi | G06F 16/137 |
| 2017/0032123 A1 * | 2/2017 | Carson | G06F 21/52 |
| 2017/0351877 A1 * | 12/2017 | Knapp | H04L 63/145 |
| 2018/0107824 A1 * | 4/2018 | Gibbons, Jr. | G06F 21/565 |
| 2021/0109899 A1 * | 4/2021 | Angadi | G06F 16/148 |
| 2021/0216450 A1 * | 7/2021 | Hirko | H04L 67/06 |
| 2022/0083672 A1 * | 3/2022 | Riley | G06F 21/51 |
| 2022/0129551 A1 * | 4/2022 | Collier | G06F 21/565 |
| 2022/0245249 A1 * | 8/2022 | Hewlett, II | G06F 21/566 |
| 2022/0292194 A1 * | 9/2022 | Edwards | G06F 9/485 |

FOREIGN PATENT DOCUMENTS

| | | | | |
|---|---|---|---|---|
| EP | 3814961 A1 * | 5/2021 | | G06F 21/566 |
| EP | 3989092 A1 * | 4/2022 | | G06F 11/1446 |

* cited by examiner

*Primary Examiner* — Sakinah White Taylor
(74) *Attorney, Agent, or Firm* — D2 Worldwide LLC; Frank Liebenow (57) ABSTRACT

A system and method for computer security of a protected device that has a processor and an operating system software running on the processor includes security software that runs on the protected device and has local data for control of the security software. Upon initialization of the security software, the security software loads the local data and periodically reads file-type associations from the operating system software. For each file-type association, the security software determines if that file type is permitted by the local data and if that file type is not permitted by the local data, the security software removes that file-type association from the operating system software.

10 Claims, 7 Drawing Sheets

MONITORING AND VALIDATING FILE ASSOCIATIONS

FIELD

This invention relates to the field of computer security and more particularly to a system for monitoring and preventing perturbation of file-type associations for malicious reasons.

BACKGROUND

For many operating systems, files have an application type embedded in the filename itself. For example, a Microsoft® Windows® file that ends in ".exe" signifies that the file is executable and is to be open and run by the operating system, compared with a file that ends in ".gif" which signifies that the file is an image file which is to be opened with an image viewer program to which it is associated. For example, when the file ending in ".gif" is selected (e.g., opened), the operating system finds an association to a program for all files that end in ".gif". The operating system runs the program and presents the file to that program for opening and manipulating, in this case, for displaying an image.

In this example, the extension (the part of the file name that follows the last period or dot) is used by the operating system to determine how to interact with the file. A user, administrator, or installation script has the ability to set an association, for example, when a new file type is created. There are operating system tools for setting up such associations. For example, when a user or administrator installs a new web browser, the user or installation scrip must associate web browser extensions with the new browser so that when the user opens a web page (e.g., http://www.homepage.htlm), the new browser is used to open the web page.

Unfortunately, there is no enforcement of extension associations. For example, the user (or a malicious entity) is able to associate files that end in ".gif" with a program that processes spreadsheets. This opens the door for a malicious entity to create an executable file that has a suffix of ".gif". As image files are often benign, users and security software will classify such a file as innocuous, indicating it is harmless, when it in fact is now executable and certainly not benign.

Operating systems provide support for new file types, typically those that are not native to the system. Most operating systems provide a mechanism to associate any extension with any handling program. So where a user may be suspicious of a file that ends in ".wsf," which is typically associated with a script, they may be less suspicious of a file that ends in ".zyx"; unaware that behind the scenes a malicious entity has associated the ".zyx" file extension with a scripting engine. Such an association will cause that file to be executable code instead of a harmless image, and when accessed, invoke a scripting engine instead of an image viewer. From there, this malicious script is able to install further malware on the computer or access files and data as desired.

What is needed is a system that will detect unauthorized associations and disable the unauthorized associations until proven to be safe.

SUMMARY

Elements of the disclosed invention include monitoring software installed on a protected device (e.g., computer) that periodically monitors associations by reading operating system files and checking each association to determine if that association is safe (e.g., the association is known or is not known to be malicious). In order to determine if each association is safe, in some embodiments, files such as whitelists and blacklist are deployed to each protected device, each containing known safe associations (whitelists) or known malicious associations (blacklists), for example, a whitelist containing a list of all allowed file-type associations. In the whitelist example, when the monitor software periodically scans the set of associations, the whitelist is searched for each association and when an association is found that is not in the whitelist, that association is disabled or removed. In some embodiments, the potentially malicious association is reported and, in some embodiments, the potentially malicious association is forwarded to a server for further analysis. Then, if the further analysis concludes that the association is not malicious, the whitelist is updated to include the disabled association and the monitoring software running on the device on which the potentially malicious association was discovered is informed so that the disabled association will be reinstated.

In one embodiment, a system for computer security is disclosed including a protected device that has a processor and an operating system software running on the processor. Security software running on the protected device has local data for control of the security software. Upon initialization of the security software, the security software loads the local data and periodically, the security software reads file-type associations from the operating system software. For each file-type association, the security software determines if that file type is permitted by the local data and if that file type is not permitted by the local data, the security software removes that file-type association from the operating system software.

In another embodiment, a method of protecting a protected device is disclosed. The protected device has a processor and an operating system running on the processor. The method includes installing security software on the protected device. The security software runs on the processor after the protected device is initialized and reads a local data file to control file-type associations. The security software periodically reads a list of file-type associations from the operating system and for each of a file-type association in the list of file-type associations, the security software determines when the file-type association is blocked by the local data file and when the file-type association is blocked by the local data file, the security software removes the file-type association from the operating system.

In another embodiment, computer readable instructions for providing security to a protected device are tangibly embodied in a non-transitory storage medium are disclosed including computer readable instructions running on a processor of the protected device after the protected device is initialized, the computer readable instructions read a local data file to control file-type associations. Upon initialization, the computer readable instructions running on the processor periodically read a list of file-type associations from an operating system of the protected device. For each file-type association in the list of file-type associations, the computer readable instructions running on the processor uses the local data file to determine if the file-type association is blocked and when the file-type association is blocked, the computer readable instructions running on the processor removes the file-type association from the operating system.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Reference will now be made in detail to the presently preferred embodiments of the invention, examples of which are illustrated in the accompanying drawings. Throughout the following detailed description, the same reference numerals refer to the same elements in all figures.

In general, the system for expedited delivery initiates fast downloads of cloud files that have been recently updated, in particular, virus protection files.

Throughout this description, the term, "protected" refers to any device that has a processor and runs software. One example of such is a personal computer. Another example is a smartphone or tablet. The term, "user" refers to a human that has an interest in the computer, perhaps a user who is using the computer.

Figure 1:
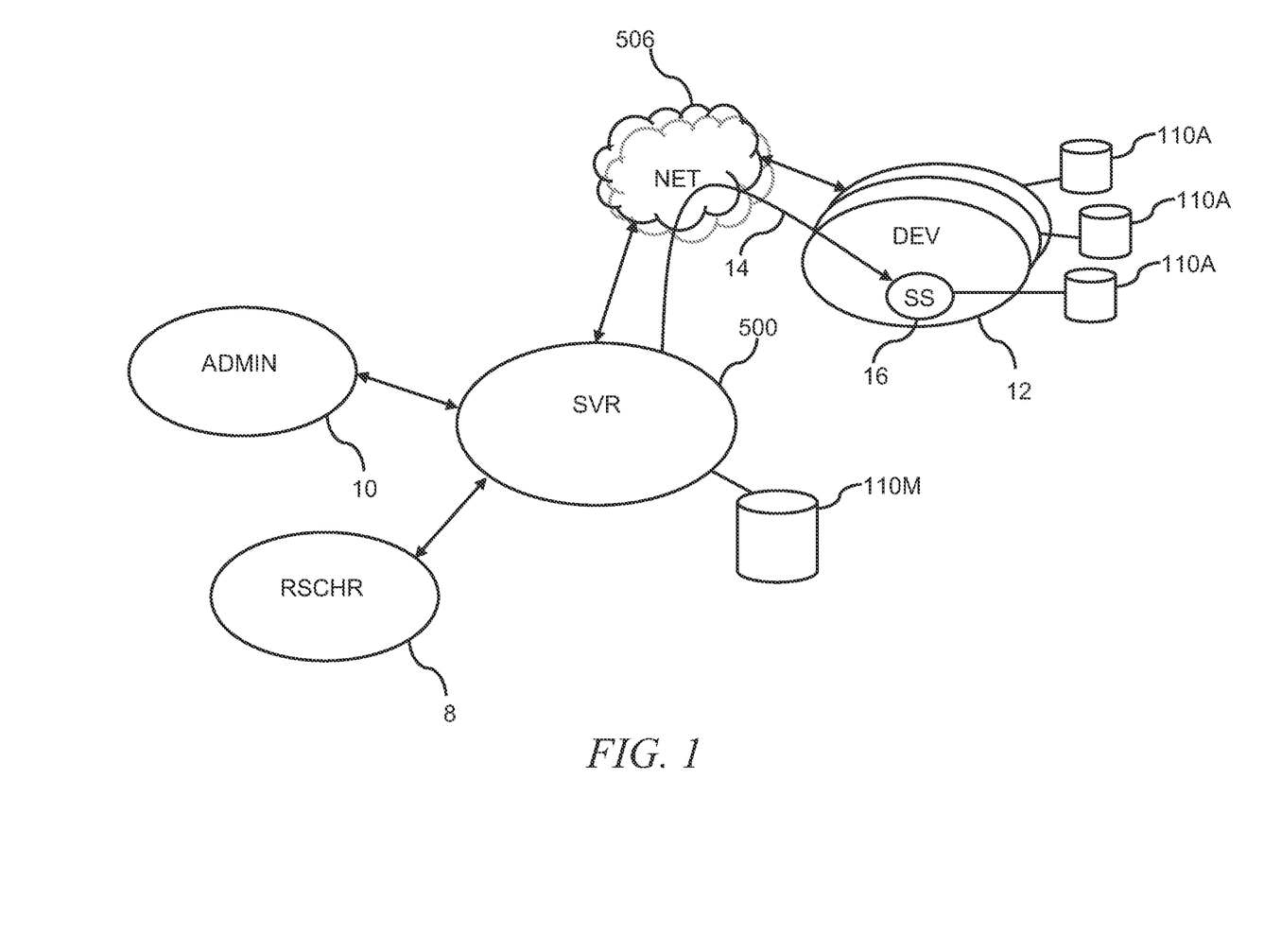
FIG. 1 illustrates a data connection diagram of the system for monitoring and validating file associations on a target device.

Referring to FIG. 1 illustrates a data connection diagram of the exemplary system for monitoring and validating file associations on a target device. In this example, a master file 110M is stored in a storage of a server 500 and manipulated by an administrator device 10, by an administrator. As an example, the master file 110M includes a master list of approved file-type associations which are permitted for one or many protected devices 12, as for example, a whitelist of approved associations. The administrator edits/manages the master file 110M and, once ready, transfers the master file 110M to the protected devices 12 where the list of approved file-type associations is stored locally as local data 110A (e.g., in memory, a file). The security software 16 running on the protected device 12 periodically retrieves a list of file-type associations from the operating system running on the protected device 12, for example, every ten minutes. For each file-type association in the list, the security software 16 checks the file-type association against the local data 110A to determine if the current file-type association is approved (e.g., the current file-type association is in a whitelist of the local data 110A) or if the current file-type association is banned (e.g., the current file-type association is in a blacklist of the local data 110A).

If the current file-type association from the list is not approved or is banned, the security software 16 disables or deletes the current file-type association from the operating system and sends a transaction to the server 500 that describes details of the current file-type association such as the suffix (e.g., ".gif"), the association (e.g., script editor), and other available information such as the time/date when this file-type association was made. In some embodiments, the security software 16 also notifies a user of the protected device 12, for example by a message (e.g., SMS or email) or a pop-up message.

When the transaction containing the details is received by the server 500, software running on the server 500 performs an analysis of the association to determine if the file-type association is good, if it is malicious, or if such cannot be determined.

If the analysis determines that the file-type association is good, the file-type association is added to the whitelist of the master file 110M which will eventually be distributed to the protected devices 12 and such file-type association will be permitted on the protected devices 12. A transaction is also sent to the security software 16 running on the protected device 12 that reported the file-type association so that the deleted file-type association will be reinstated by the security software 16.

If the analysis determines that the file-type association is malicious, the file-type association is added to the blacklist of the master file 110M which will eventually be distributed to the protected devices 12 and such file-type association will be blocked on the protected devices 12.

If the analysis cannot determine whether the file-type association is malicious or not, the file-type association is queued for a researcher at a researcher device 8. The researcher analyzes the file-type association and adds the file-type association to the whitelist (if deemed a good file-type association by the researcher) or to the blacklist (if deemed a malicious file-type association) of the master file 110M which will eventually be distributed to the protected devices 12 and such file-type association will be allowed or blocked on the protected devices 12.

Figure 2:
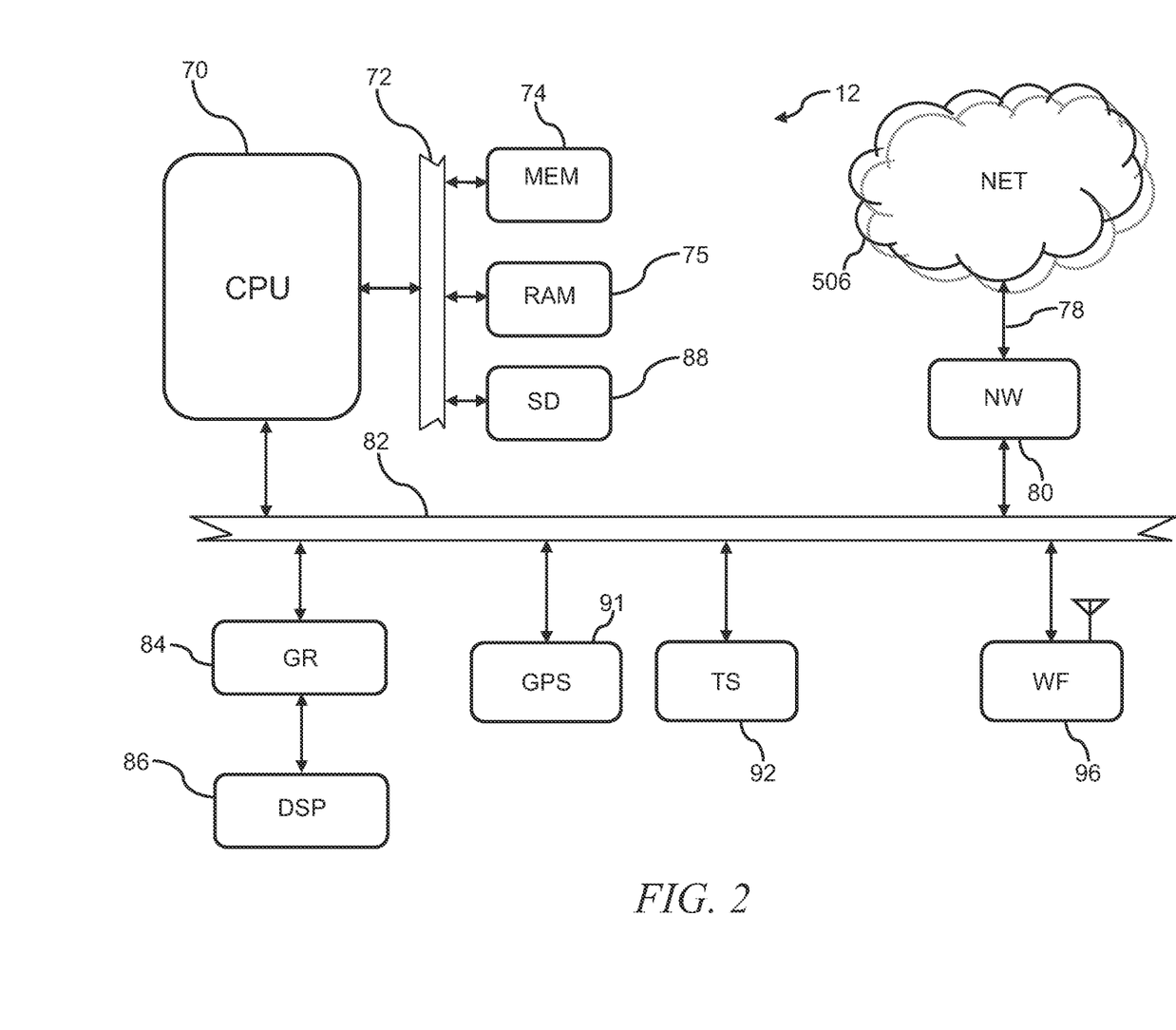
FIG. 2 illustrates a schematic view of a typical end-point device controlled by the system for monitoring and validating file associations on a target device.

Referring to FIG. 2, a schematic view of an exemplary protected device 12 is shown. The exemplary protected device 12 is a processor-based device that is protected from malware by security software 16 (see FIG. 1). The present invention is in no way limited to any particular protected device 12, as many other processor-based devices are equally anticipated including, but not limited to smart phones, cellular phones, portable digital assistants, routers, thermostats, fitness devices, etc.

The exemplary protected device 12 represents a typical device used by an end user or employee. This exemplary protected device 12 is shown in its simplest form. Different architectures are known that accomplish similar results in a similar fashion, and the present invention is not limited in any way to any particular system architecture or implementation. In this exemplary protected device 12, a processor 70 executes or runs programs in a random-access memory 75. The programs are generally stored within a persistent memory 74 and loaded into the random-access memory 75 when needed. In some protected devices 12, a removable storage slot 88 (e.g., compact flash, SD) offers removable persistent storage. The processor 70 is any processor, typically a processor designed for phones. The persistent memory 74, random access memory 75, and SIM card are connected to the processor by, for example, a memory bus 72. The random-access memory 75 is any memory suitable for connection and operation with the selected processor 70, such as SRAM, DRAM, SDRAM, RDRAM, DDR, DDR-2, etc. The persistent memory 74 is any type, configuration, capacity of memory suitable for persistently storing data, for example, flash memory, read only memory, battery-backed memory, etc. In some exemplary protected devices 12, the persistent memory 74 is removable, in the form of a memory card of appropriate format such as SD (secure digital) cards, micro-SD cards, compact flash, etc.

Also connected to the processor 70 is a system bus 82 for connecting to peripheral subsystems such as a network interface 80, a graphics adapter 84 and a touch screen interface 92. The graphics adapter 84 receives commands from the processor 70 and controls what is depicted on the display 86. The touch screen interface 92 provides navigation and selection features.

In general, some portion of the persistent memory 74 and/or the removable storage 88 is used to store programs, executable code, phone numbers, contacts, and data, etc. In some embodiments, other data is stored in the persistent memory 74 such as audio files, video files, text messages, etc.

The peripherals are examples, and other devices are known in the industry such as Global Positioning Subsystems, speakers, microphones, USB interfaces, cameras, microphones, Bluetooth transceivers, Wi-Fi transceivers 96, touch screen interfaces 92, image sensors, temperature sensors, etc., the details of which are not shown for brevity and clarity reasons.

The network interface 80 connects the exemplary protected device 12 to the network 506 (e.g., the Internet) through any known or future protocol such as Ethernet, WI-FI, GSM, TDMA, LTE, etc., through a wired or wireless medium. There is no limitation on the type of connection used. The network interface 80 provides data and messaging connections between the exemplary protected device 12 and the server 500 through the network 506.

Figure 3:
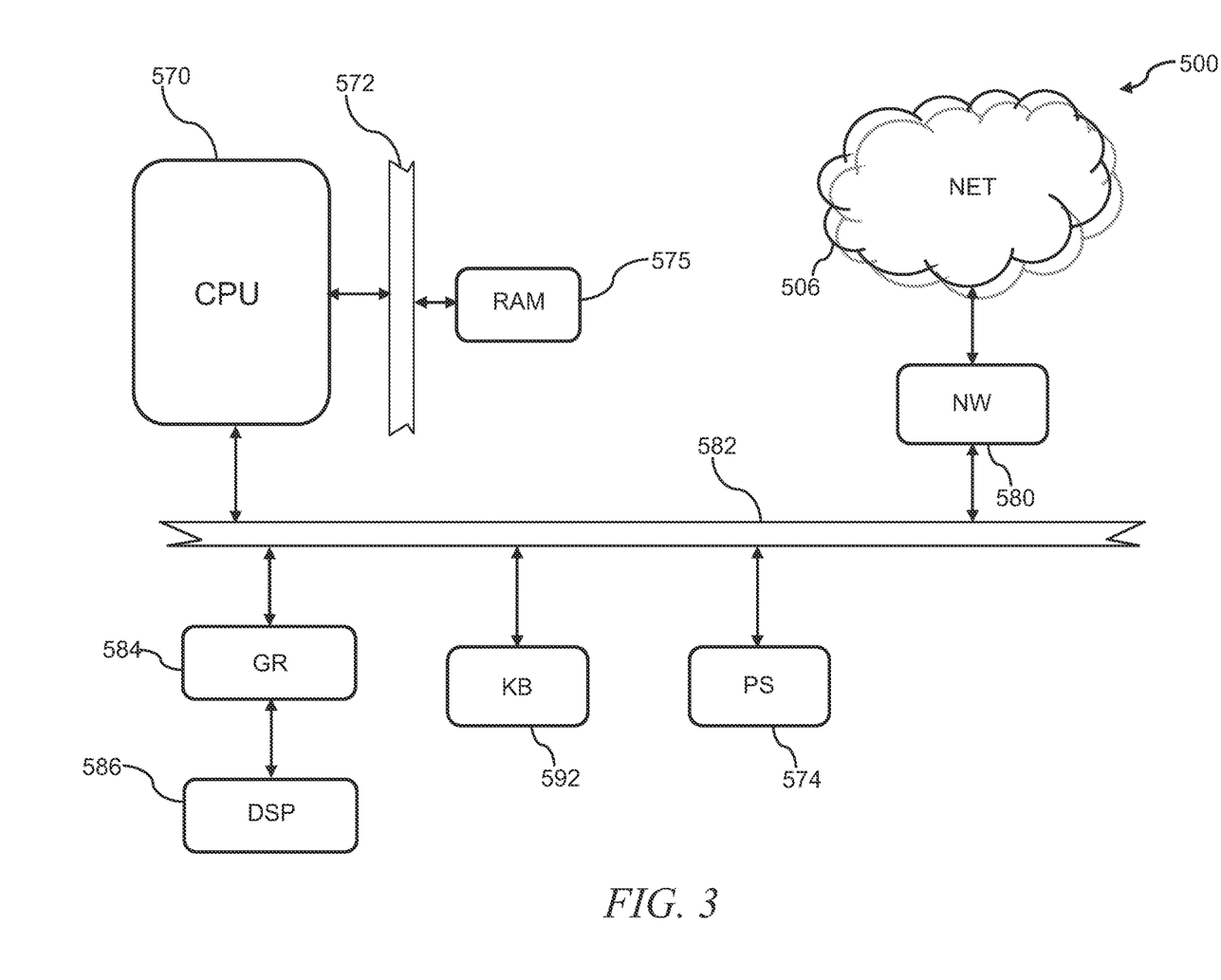
FIG. 3 illustrates a schematic view of a typical server computer system.

Referring to FIG. 3, a schematic view of a typical server 500 is shown. The exemplary server 500 represents a typical server computer system. Although the exemplary server 500 is shown as a stand-alone system, it is fully anticipated that the server 500 be part of a cloud-computing environment or include multiple computers. Different architectures are known that accomplish similar results in a similar fashion and the present invention is not limited in any way to any particular computer system architecture or implementation. In this exemplary computer system, a processor 570 executes or runs programs in a random-access memory 575. The programs are generally stored within a persistent memory 574 and loaded into the random-access memory 575 when needed. The processor 570 is any processor, typically a processor designed for computer systems with any number of core processing elements, etc. The random-access memory 575 is connected to the processor by, for example, a memory bus 572. The random-access memory 575 is any memory suitable for connection and operation with the processor 570, such as SRAM, DRAM, SDRAM, RDRAM, DDR, DDR-2, etc. The persistent memory 574 is any type, configuration, capacity of memory suitable for persistently storing data, for example, magnetic storage, flash memory, read only memory, battery-backed memory, magnetic memory, etc. The persistent memory 574 is typically interfaced to the processor 570 through a system bus 582, or any other interface as known in the industry.

Also shown connected to the processor 570 through the system bus 582 is a network interface 580 (e.g., for connecting to a network 506—e.g., the Internet), a graphics adapter 584 and a keyboard interface 592 (e.g., Universal Serial Bus—USB). The graphics adapter 584 receives information from the processor 570 and controls what is depicted on a display 586. The keyboard interface 592 provides navigation, data entry, and selection features.

In general, some portion of the persistent memory 574 is used to store programs, executable code, master files 110M, and other data, etc.

The peripherals are examples and other devices are known in the industry such as pointing devices, touch-screen interfaces, speakers, microphones, USB interfaces, Bluetooth transceivers, Wi-Fi transceivers, image sensors, temperature sensors, etc., the details of which are not shown for brevity and clarity reasons.

Figure 4:
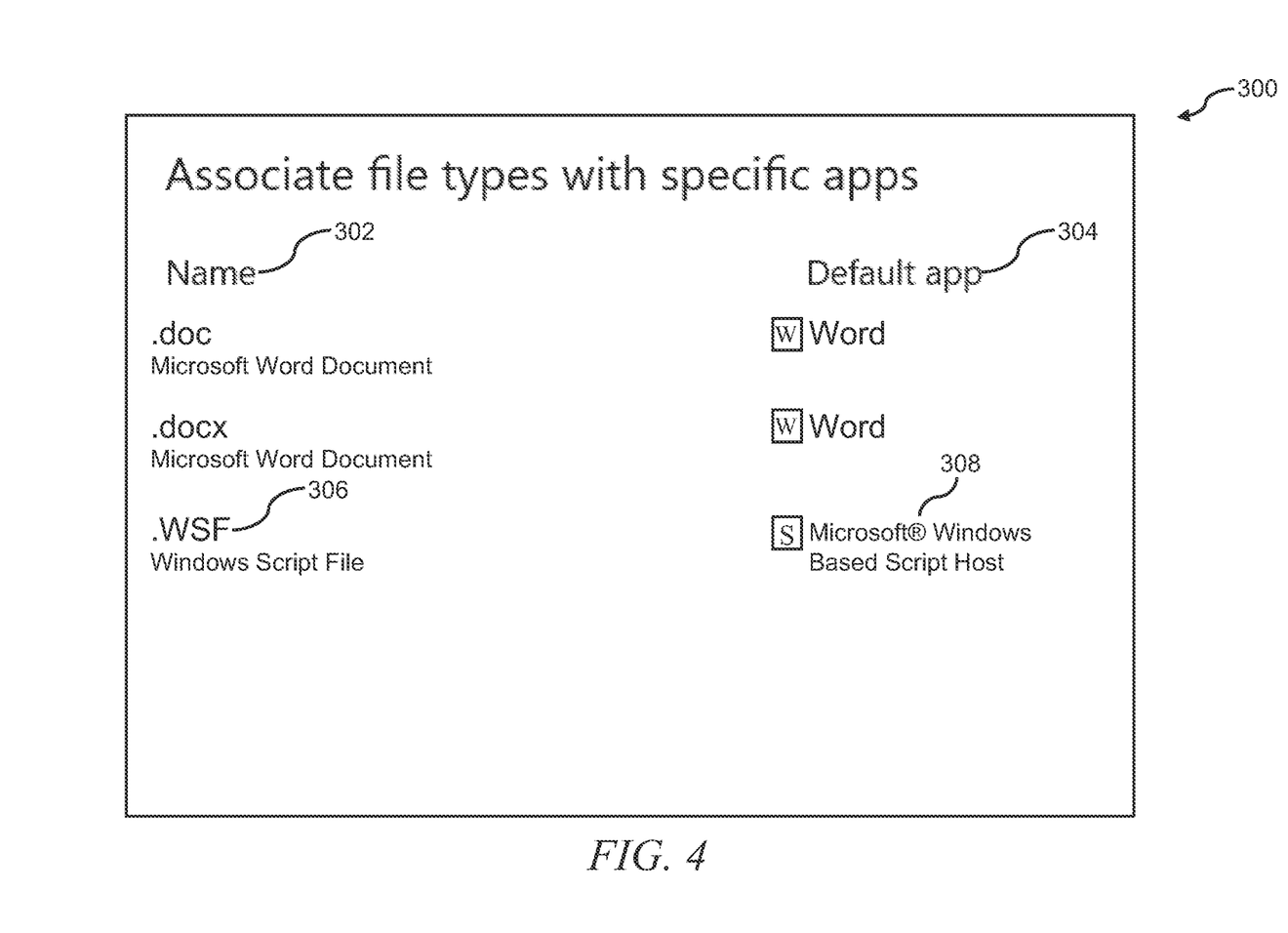
FIG. 4 illustrates a user interface for listing file-type associations.
Figure 5:
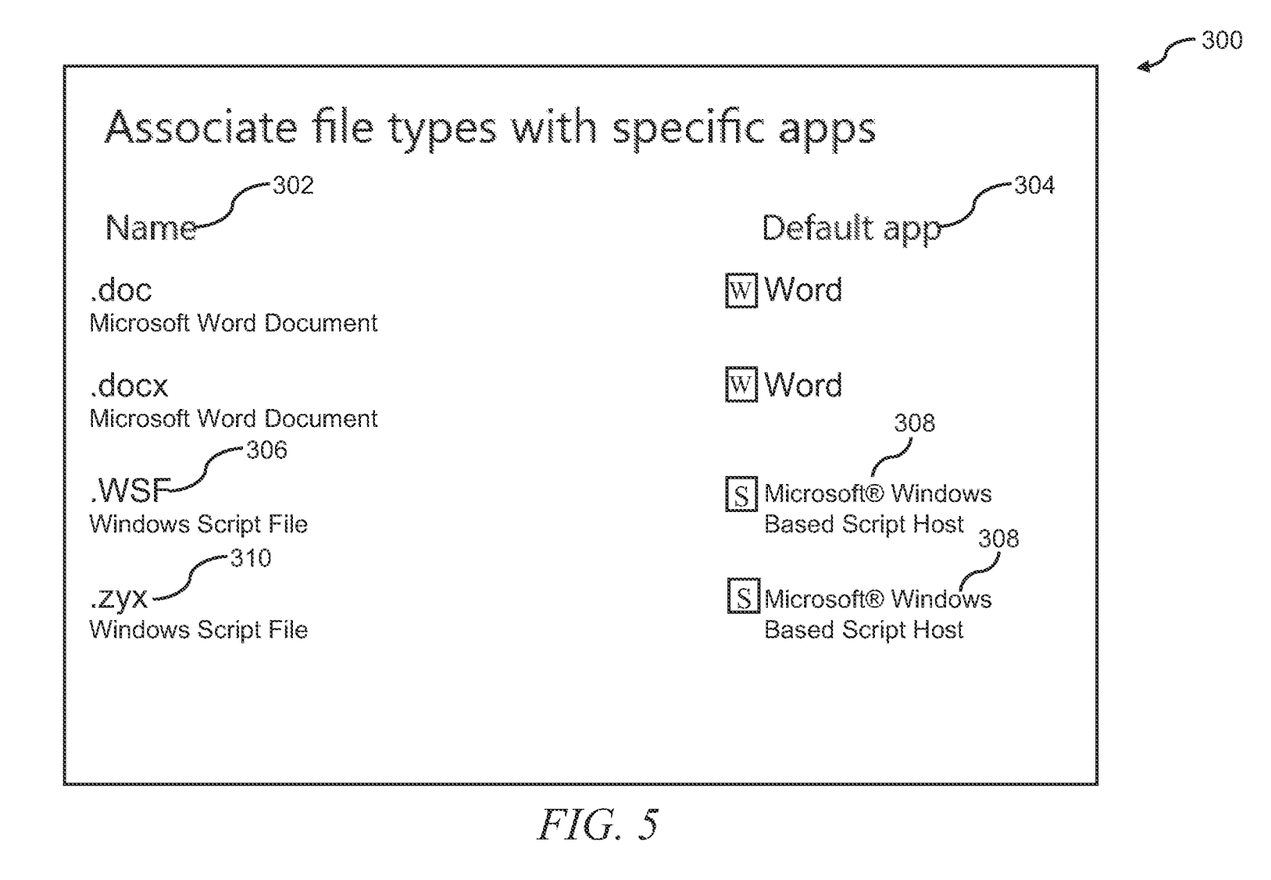
FIG. 5 illustrates a later view of the user interface for listing file-type associations.

Referring to FIGS. 4 and 5, a user interface 300 for listing file-type associations is shown. In such, to the left are names of file types 302, in this example, file name extensions such as ".doc", ".docx" and ".wsf". In the right column are default applications 304 for the corresponding file type 302. For example, when a file having a file name ending in ".doc" is selected (e.g., double click in an explorer window), the default application of "WORD" is run to process that file. Likewise when a file having a file name ending in ".wsf" 306 is selected (e.g., double click in an explorer window), the default application of "Microsoft® Windows Based Script Host" 308 is run to process that file. In FIG. 5, a new filetype association has been added (e.g., by a malicious entity). This association includes files ending in "zyx" 310 and the default application of "Microsoft® Windows Based Script Host" 308. With such, if a user of the computer accesses a file such as "mypicture.zyx", based upon this association, "Microsoft® Windows Based Script Host" 308 is launched to process the file, which may include virus script software that is dangerous to the computer. Many computer users are likely to be unaware of the dangers of such rouge application associations. Further, if a bad actor changes a well-known association, for example, ".gif"—the unexpecting use will often click on what is believed to be an image file believing that it is harmless.

Figure 6:
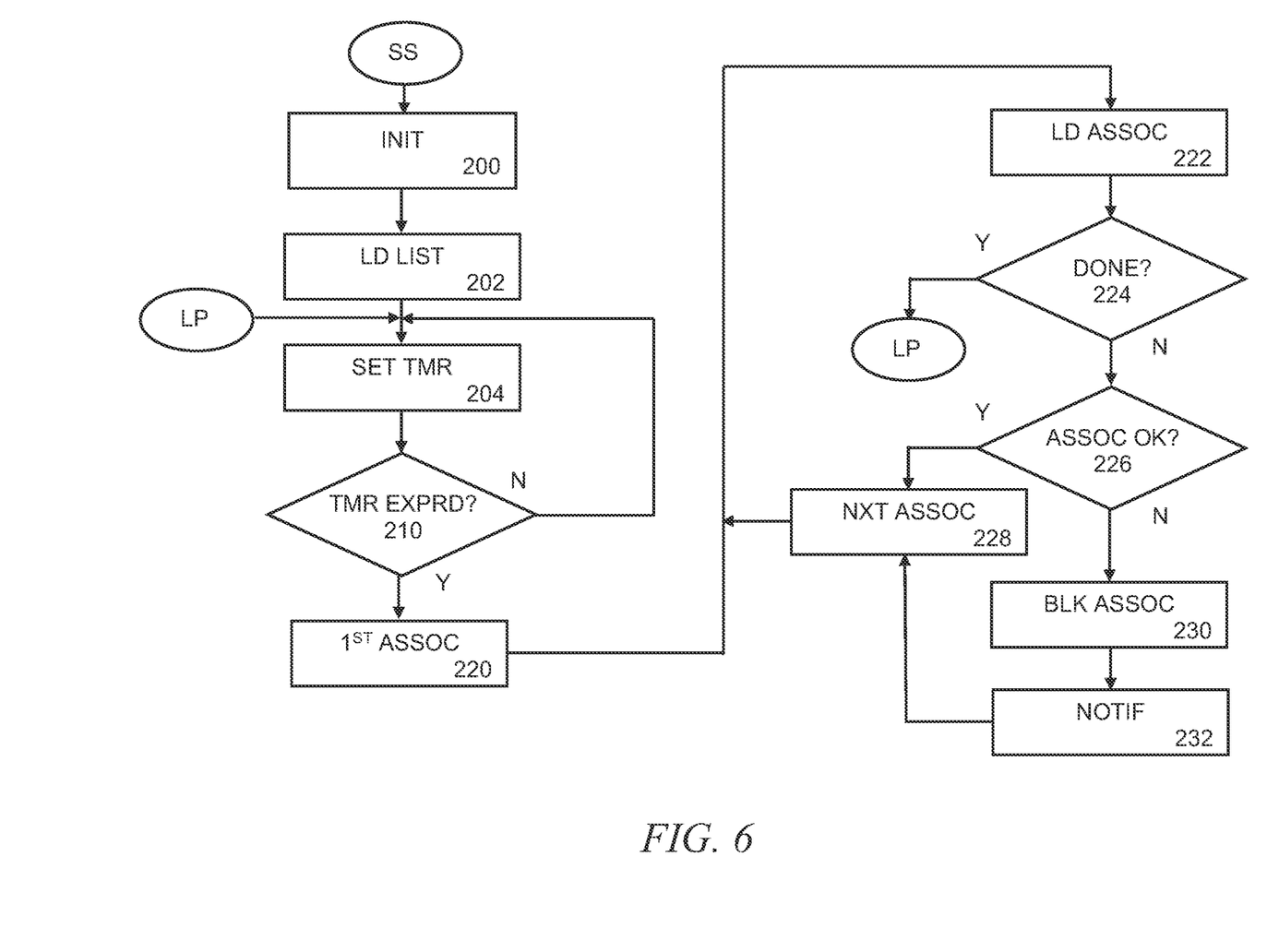
FIGS. 6 and 7 illustrate exemplary program flows of the system for monitoring and validating file associations on a target device.
Figure 7:
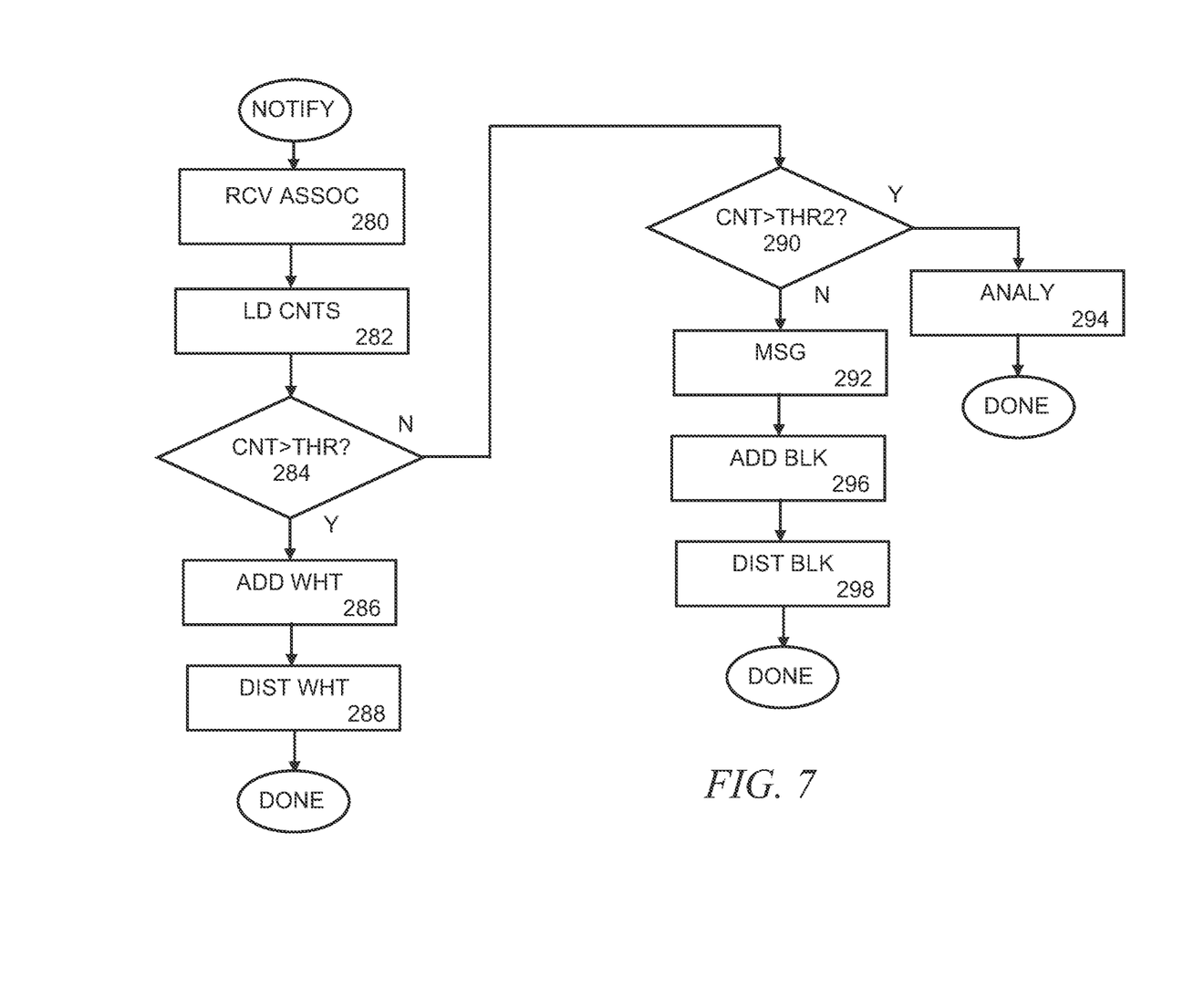

Referring to FIGS. 6 and 7, exemplary program flows of the system for monitoring and validating file associations on a device is shown. Note that although the following flow charts indicate software running on the protected device 12 and running on the server 500, any division of functionality is fully anticipated including the entire process running on the protected device 12.

In the example of FIG. 6, the security software 16 initializes 200 and loads 202 the list of approved file-type associations (e.g., whitelist) is stored locally as local data 110A (e.g., in memory, a file) or in some embodiments the list of prohibited file-type associations (e.g., blacklist) stored locally as local data 110A. The security software 16 running on the protected device 12 periodically retrieves a list of file-type associations from the operating system running on the protected device 12, for example, setting a timer 204 for ten minutes. When the timer expires 210, the security software 16 starts at the first file-type association 220 and loads this file-type association 222 (for example, in MS Windows®, the file-type associations are stored in the registry). If there are no more file-type associations, the check is done 224 and the above is repeated. If not done 224, the security software 16 checks 226 the file-type association against the local data 110A to determine if the current file-type association is approved (e.g., the current file-type association is in a whitelist of the local data 110A) or if the current file-type association is banned (e.g., the current file-type association is in a blacklist of the local data 110A).

If the analysis determines that the current file-type association is good 226, the next file-type association is addressed 228 and the above is repeated for this file-type association.

If the analysis determines that the current file-type association is not good 226, the current file-type association is blocked 230 (e.g., the registry entry for the current file-type association is removed from the registry) and a notification is sent 232 to the server 500. As above, the next file-type association is addressed 228 and the above is repeated for this next file-type association.

In FIG. 7, the software running on the server 500 receives 280 the file-type association that was determined to be not good by the security software 16 running on the protected device 12 (e.g., the association is not on the whitelist or is on the blacklist, or both). In order to algorithmically determine if this association is good or bad, the software running on the server 500 loads a database of file type counts 282 which includes total counts found globally (or locally) of all possible file-type associations. For example, the list will have a very high number of associations between ".doc" and WORD and a very small number of associations between "doc" and a spreadsheet program, as spreadsheet programs are not often used to open document files. If the count from the list for this file-type association is greater than a set threshold 284 (e.g., thousands of other devices use this association), the file-type association is added to the whitelist 286 (e.g, added to the master file 110M) which is eventually distributed 288 to the protected devices 12 and such file-type association will then be permitted on the protected devices 12. In some embodiments, a transaction is also sent to the security software 16 running on the protected device 12 that reported the file-type association so that the deleted file-type association will be reinstated by the security software 16 (not shown for clarity reasons).

If the count from the list for this file-type association is not greater than a set threshold 284, but the count from the list for this file-type association is greater than a second set threshold 290, it is assumed that many users are interested in this file-type association and this file-type association is queued for analysis 294 (e.g., reviewed by a researcher at a researcher device 8 to determine if this file-type association is dangerous and possibly malicious).

If the count from the list for this file-type association is not greater than a set threshold 284, and the count from the list for this file-type association is not greater than a second set threshold 290, then this file-type association is declared as malicious and a warning message 292 is displayed. In embodiments using blacklists, this file-type association is added 296 to the blacklist in the master data file 110M and distributed 298 to the protected devices 12.

It is anticipated that when the researcher analyzes this file-type association, the researcher will add the file-type association to the whitelist (if deemed a good file-type association by the researcher) or to the blacklist (if deemed a malicious file-type association) of the master file 110M which will eventually be distributed to the protected devices 12 and such file-type association will be allowed or blocked on the protected devices 12.

The above is an exemplary implementation using a time delay and it is equally anticipated to implement the same or similar functionality using interrupt algorithms or any way to periodically check for valid file-type associations.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for computer security, the system comprising:
a protected device, the protected device having a processor and an operating system software running on the processor;
security software running on the protected device, the security software has local data for control of the security software;
upon initialization of the security software, the security software loads the local data;
periodically, the security software reads file-type associations from the operating system software and for each file-type association, the security software determines when that file-type is permitted by the local data and when that file-type is not permitted by the local data, the security software removes that file-type association from the operating system software; and
a server and wherein when the security software removes that file-type association from the operating system software, the security software sends a transaction comprising that file-type association to the server and software running on the server further analyzes that file-type association to determine when that file-type association is to be permitted;
wherein the software running on the server analyzes that file-type association using a list of counts of known file-type associations indicating how many other devices have that file-type association and when a count from the list of counts for that file-type association is greater than a threshold, that file-type association is permitted in a master data file and, the master data file is distributed to the protected device;
wherein when the protected device receives the master data file, the security software updates the local data for permitting that file type association and the security software informs reinstatement.

2. The system of claim 1, wherein the file-type associations are stored in a registry of the operating system software.

3. The system of claim 1, wherein the software running on the server analyzes that file-type association using the list of counts of known file-type associations indicating how many other devices have that file-type association and when the count from the list of counts for that file-type association is less than or equal to the threshold and when the count from the list of counts for that file-type association is less than or equal to a second threshold, that file-type association is queued for a researcher.

4. The system of claim 3, wherein the software running on the server analyzes that file-type association using the list of counts of known file-type associations indicating how many other devices have that file-type association and when the count from the list of counts for that file-type association is less than or equal to the threshold and when the count from the list of counts for that file-type association is less than or equal to the second threshold, that file-type association is declared malicious in the master data file and the master data file is distributed to the protected device.

5. The system of claim 1, wherein the local data for control of the security software is a whitelist.

6. The system of claim 1, wherein the local data for control of the security software is a blacklist.

7. A method of protecting a protected device, the protected device having a processor and an operating system running on the processor, the method comprising:
- installing security software on the protected device, the security software running on the processor after the protected device is initialized, the security software reading a local data file to control file-type associations;
- upon initialization of the security software on the processor, the security software periodically reading a list of file-type associations from the operating system and for each of a file-type association in the list of file-type associations, the security software determining when the file-type association is blocked by the local data file and when the file-type association is blocked by the local data file, the security software removing the file-type association from the operating system;
- when the file-type association is blocked by the local data file, the security software sending a transaction comprising the file-type association to a server;
- when the server receives the transaction, software running on the server further analyzing the file-type association to determine when the file-type association is to be blocked; and
- the software running on the server analyzing the file-type association using a list of counts of known file-type associations indicating how many other devices have that file-type association and when a count from the list of counts for the file-type association is greater than a threshold, the software running on the server updating a master data file to indicate that the file-type association is permitted and, the software running on the server distributing the master data file to the protected device; wherein when the protected device receives the master data file, updating the local data by the security software thereby permitting the file type association and the security software informs reinstatement.

8. The method of claim 7, wherein the software running on the server analyzing that file-type association using the list of counts of known file-type associations indicating how many other devices have the file-type association and when the count from the list of counts for the file-type association is less than or equal to the threshold and when the count from the list of counts for the file-type association is less than or equal to a second threshold, the server queuing the file-type association for a researcher.

9. The method of claim 8, wherein when the software running on the server analyzing the file-type association using the list of counts of known file-type associations determining the count from the list of counts for that file-type association is less than or equal to the threshold and when the count from the list of counts for that file-type association is less than or equal to the second threshold, the software running on the server adding the file-type association to the master data file to block the file-type association and the software running on the server distributing the master data file to the protected device.

10. The method of claim 9, wherein the threshold and the second threshold are equal.

* * * * *